(12) United States Patent
Pan

(10) Patent No.: US 11,819,158 B2
(45) Date of Patent: *Nov. 21, 2023

(54) AUTOMATIC STIR-FRYING DEVICE OF FOOD FRYING MACHINES

(71) Applicant: O-VIEW Technology Co., Ltd., New Taipei (TW)

(72) Inventor: Chia-I Pan, New Taipei (TW)

(73) Assignee: O-VIEW TECHNOLOGY CO., LTD., New Taipei (TW)

( * ) Notice: Subject to any disclaimer, the term of this patent is extended or adjusted under 35 U.S.C. 154(b) by 583 days.

This patent is subject to a terminal disclaimer.

(21) Appl. No.: 16/911,009

(22) Filed: Jun. 24, 2020

(65) Prior Publication Data

US 2020/0405096 A1 Dec. 31, 2020

(30) Foreign Application Priority Data

Jun. 27, 2019 (TW) .................................. 108122635

(51) Int. Cl.
*A47J 36/16* (2006.01)
*A47J 37/10* (2006.01)
(Continued)

(52) U.S. Cl.
CPC ........... *A47J 36/165* (2013.01); *A47J 27/004* (2013.01); *A47J 36/34* (2013.01); *A47J 37/047* (2013.01);
(Continued)

(58) Field of Classification Search
CPC ....... A47J 37/047; A47J 37/105; A47J 37/108
See application file for complete search history.

(56) References Cited

U.S. PATENT DOCUMENTS 4,571,474 A * 2/1986 Pomroy ............... H05B 6/6411
219/389
4,721,036 A * 1/1988 Brandt .................... B01F 29/63
99/348
(Continued)

FOREIGN PATENT DOCUMENTS

CN 106419478 A * 2/2017
CN 109730523 A * 5/2019
(Continued)

*Primary Examiner* — John J Norton
(74) *Attorney, Agent, or Firm* — Muncy, Geissler, Olds & Lowe, P.C.

(57) ABSTRACT

An automatic stir-frying device of food frying machines is disclosed, comprising a machine body, a food frying pot, a food material stir-frying device and a master controller, wherein the food frying pot and the food material stir-frying device are respectively installed on the machine body, the food frying pot internally includes a scraper, the food material stir-frying device has a fixing frame and a track rod, a receive-send cylinder is installed on the track rod, a movable frame is fixedly mounted on the receive-send cylinder, a rotation motor is set up on the movable frame and connectively includes a stir-frying device, and the master controller is applied to control the receive-send motor and the rotation motor so as to drive the movable frame and the stir-frying device to stretch thereby entering the inside of the food frying pot to perform automatic stir-frying operations on loaded food materials and ingredients.

7 Claims, 16 Drawing Sheets

(51) Int. Cl.
    *A47J 36/34*    (2006.01)
    *A47J 37/04*    (2006.01)
    *A47J 27/00*    (2006.01)

(52) U.S. Cl.
    CPC .......... *A47J 37/105* (2013.01); *A47J 37/108* (2013.01); *A47J 2202/00* (2013.01)

(56) References Cited

U.S. PATENT DOCUMENTS

| | | | |
|---|---|---|---|
| 9,693,654 B2 * | 7/2017 | Smith | A47J 36/34 |
| 2015/0122133 A1 * | 5/2015 | Zhang | A47J 37/10 |
| | | | 99/407 |
| 2016/0106259 A1 * | 4/2016 | Xu | G07F 9/105 |
| | | | 700/275 |

FOREIGN PATENT DOCUMENTS

| | | | |
|---|---|---|---|
| CN | 208837582 U | * | 5/2019 |
| JP | 2006061183 A | * | 3/2006 |

* cited by examiner

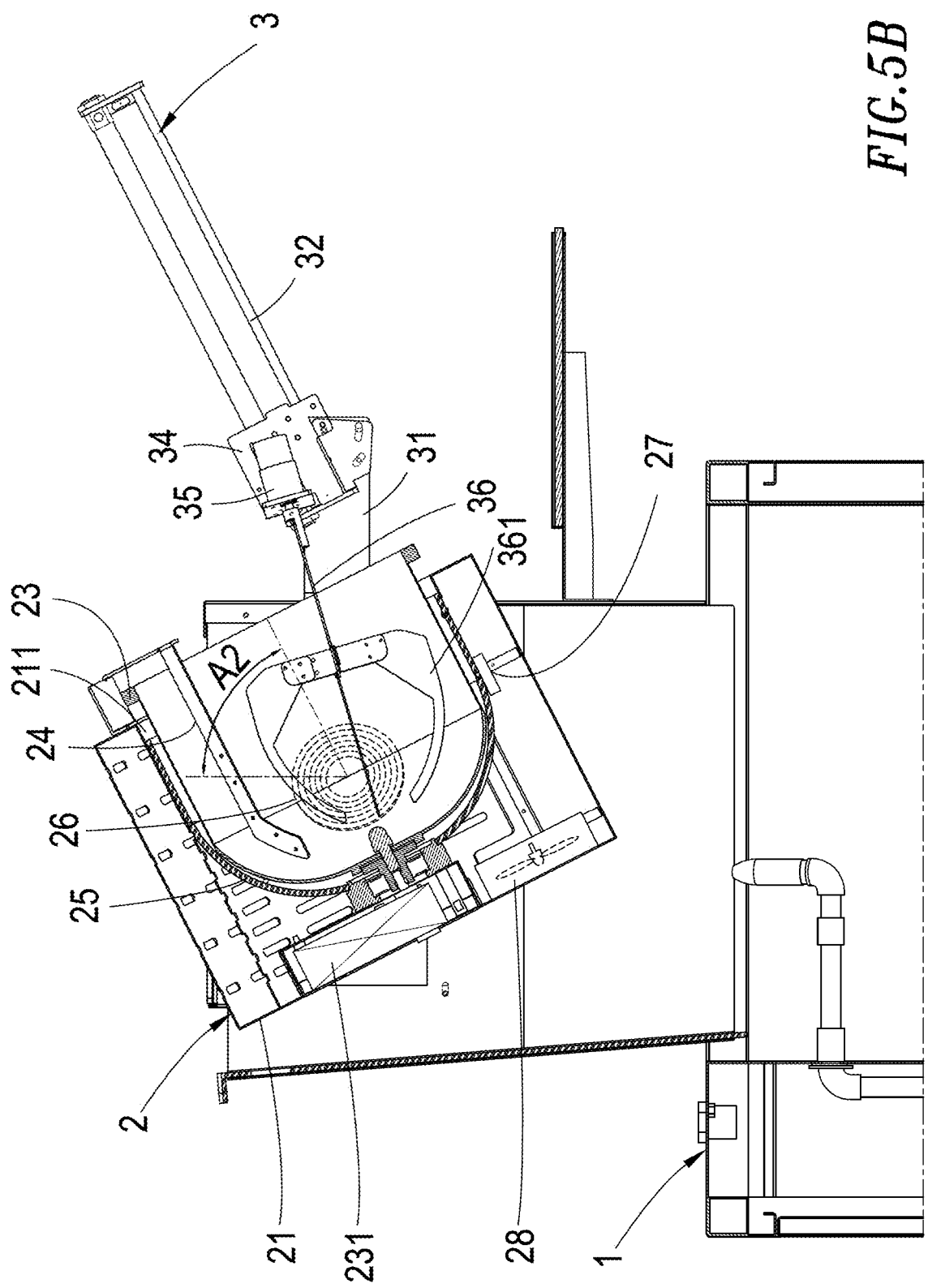

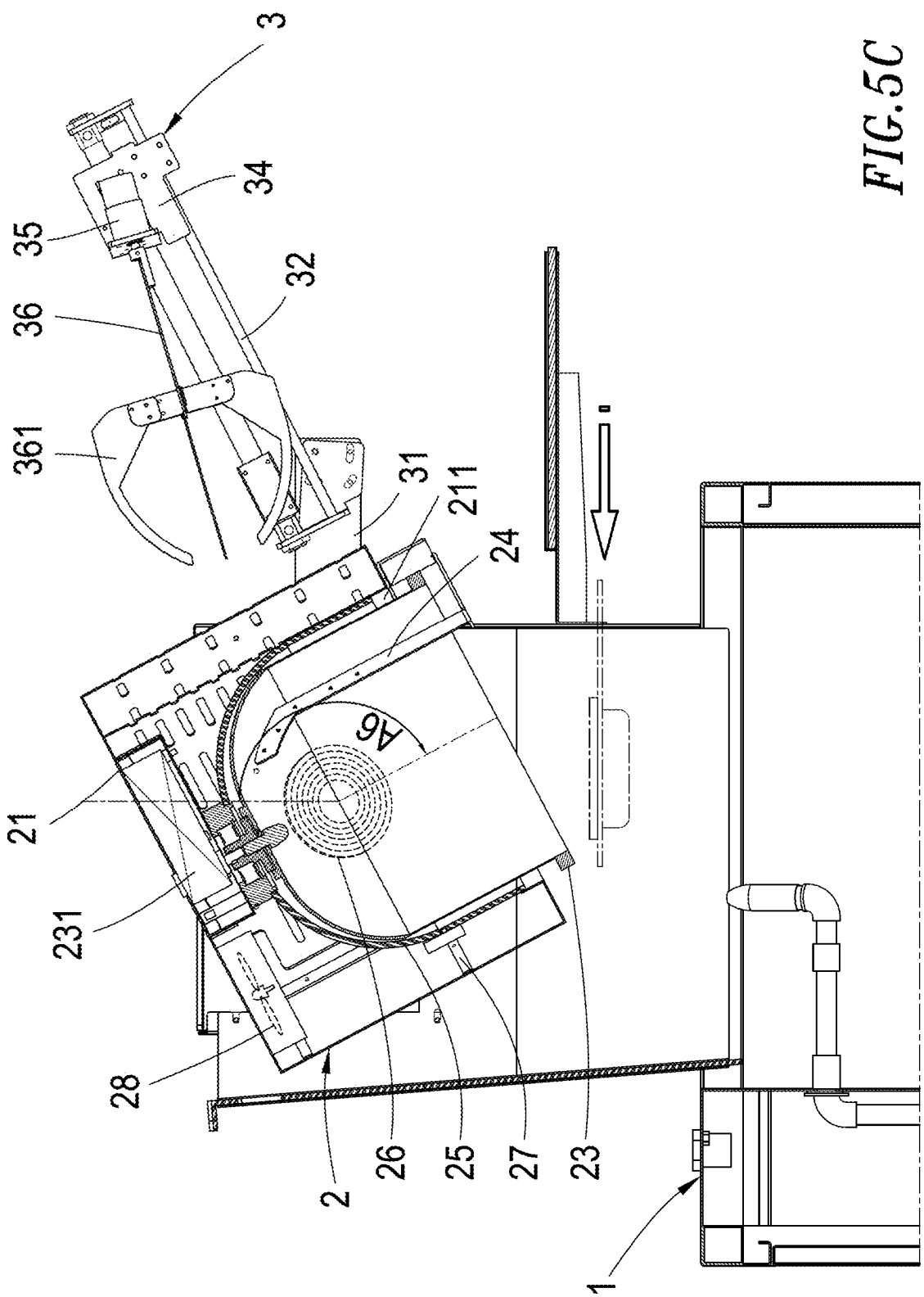

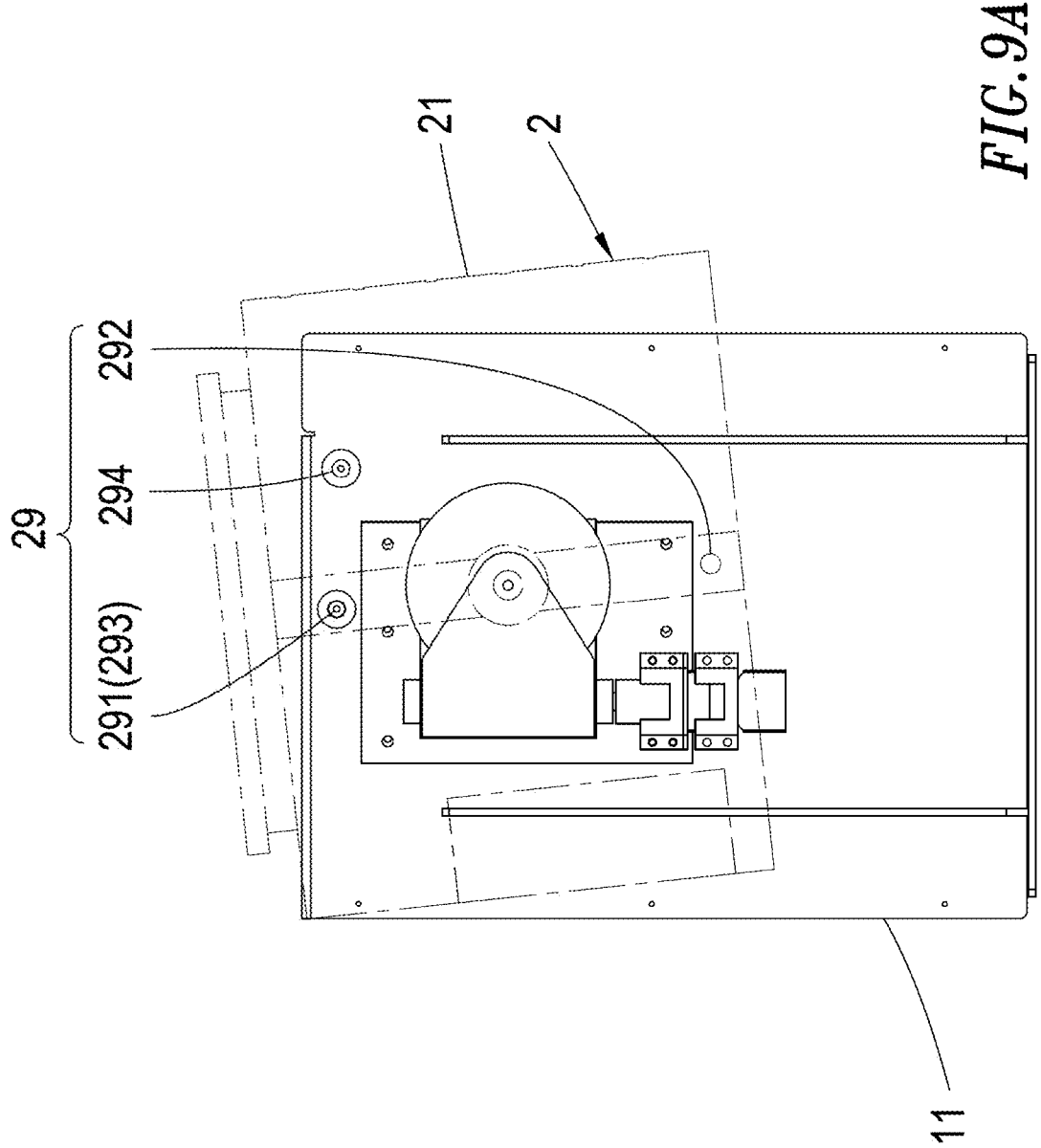

AUTOMATIC STIR-FRYING DEVICE OF FOOD FRYING MACHINES

BACKGROUND OF THE INVENTION

1. Field of the Invention

The present invention generally relates to an automatic stir-frying device of food frying machines; more specifically, it concerns an automatic or semi-automatic equipment for cooking food; in particular, it is about an equipment structure capable of automatically stir-frying various food ingredients or materials.

2. Description of Related Art

The advancements of science and technologies facilitate significant convenience to human life, and automated equipments also save lots of manpower costs and reduce technical problems which may be incurred because of human labors. In addition, as the population grows and human demands for food increase greatly, in order to ensure the stability of cooking quality, many restaurants and hotels formulate systematic protocols and processes regarding to relevant production processes from the material sources, production steps, proportion allocations, time arrangements and temperature controls, but the standardizations of foods and dishes still need to be completed by the professional chefs. In view of the aforementioned issues, it would be very desirable if a set of automated equipments can be successfully provided and applied so as to complete its systematic production processes thereby saving manpower requirements and improving the production efficiency.

Therefore, by providing equipments which are capable of automatically stir-frying food materials or ingredients and controlling the stir-frying processes via various optional and automatic settings, it is possible to achieve a food frying machine that can produce a variety of different dishes by means of manual setting assistance, thus effectively completing the solution offered by the automatic stir-frying device of food frying machines according to the present invention.

SUMMARY OF THE INVENTION

The automatic stir-frying device of food frying machines according to the present invention comprises a machine body, a food frying pot, a food material stir-frying device and a master controller, wherein the machine includes at least a support body; the food frying pot includes at least a hollow outer case body mounted on the support body, in which the outer case body is pivotally installed with a servo motor which is used to memorize a rotation angle in order to control the operating position of the outer case body, and the outer case body is recessively installed with a notch from the outside toward the inside, and the interior of the notch is pivotally installed with an inner frying pot whose bottom is pivotally installed with an inner pot motor, and in which a scraper is fixedly installed on the outer case body and extends into the inside of the inner frying pot, and the periphery of the inner frying pot is installed with a heat-resistant support board whose outside is installed in attachment with a heating coil, a temperature sensing device and at least one radiator, and the temperature sensing device is set up to sense the temperature of the outer wall of the inner frying pot through the heat-resistant support board thereby further controlling the temperature of the inner frying pot upon heating it; the food material stir-frying device includes a fixing frame fixedly installed on the support body, in which a track rod is installed on the fixing frame, a receive-send cylinder is mounted on the track rod, a movable frame is fixedly installed on the receive-send cylinder, a rotation motor is mounted on the movable frame, and the rotation motor is connected with a stir-frying device which is assembled with at least one pick, and the receive-send cylinder can drive the movable frame to move back and forth on the track rod such that the stir-frying device can enter or exit the inner frying pot, and when the stir-frying device enters into the inside of the inner frying pot, the pick is located beside the scraper; and the master controller is respectively connected to the servo motor, the inner pot motor, the heating coil, the temperature sensing device, the radiator, the receive-send cylinder as well as the rotation motor.

In this way, after activation, the outer case body can sequentially add necessary food materials therein according to the process requirements when the pot has been sufficiently heated, and the receive-send cylinder can drive the movable frame and the stir-frying device to extend into the inner frying pot, and the stir-frying device will constantly stir the loaded food materials during the stir-frying process such that the ingredients, seasoning and heat can be more evenly distributed, and the pick will move the food materials up and push towards the scraper thereby effectively breaking up the agglomerated ingredients, and the juice within meats or vegetables can be also squeezed out by means of this action in order to enhance the flavor of fried rice.

More specifically, at least two guide wheels are respectively installed at the opening edge of the notch.

More specifically, a guide board is installed at the opening edge of the notch and located oppositely between the two guide wheels.

More specifically, the scraper is close to the inner wall of the inner frying pot, but not attaches thereto.

More specifically, the number of the picks can be configured to be 1, 2, 3 or 4.

More specifically, the servo motor memorize a heating-pot angle, a stir-frying angle, a pouring angle and a cleaning angle so that the outer case body can operate at different angles.

More specifically, the heating-pot angle ranges 75°~85°, the stir-frying angle ranges 67° ~77°, the pouring angle ranges 110°~152° and the cleaning angle ranges 205°~215°.

More specifically, the exterior of the outer case body is installed with a position difference sensing device connected to the master controller and applied to sense the start and end positions of the rotation of the outer case body in order to limit the outer case body to operate in this safe angle range, and the position difference sensing device also respectively includes a start position determination block, an end position determination block, a start sensing terminal and an end sensing terminal, in which the start position determination block and the end position determination block are respectively installed on a surface of the exterior of the outer case body in opposition to the support body, and the start sensing terminal and the end sensing terminal are respectively installed on a surface of the exterior of the support body in opposition to the outer case body, such that, when the outer case body rotates, if the start sensing terminal detects the start position determination block, or otherwise the end sensing terminal detects the end position determination block, then the master controller controls the servo motor to stop the rotation operation.

BRIEF DESCRIPTION OF THE DRAWINGS

FIG. 5B shows a cross-section view of the automatic food frying machine according to the present invention, illustrated at its stir-frying angle.

FIG. 5C shows a cross-section view of the automatic food frying machine according to the present invention, illustrated at its pouring angle.

FIG. 9A shows a planar view of the outer case body in the automatic food frying machine according to the present invention, illustrated at its start position.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
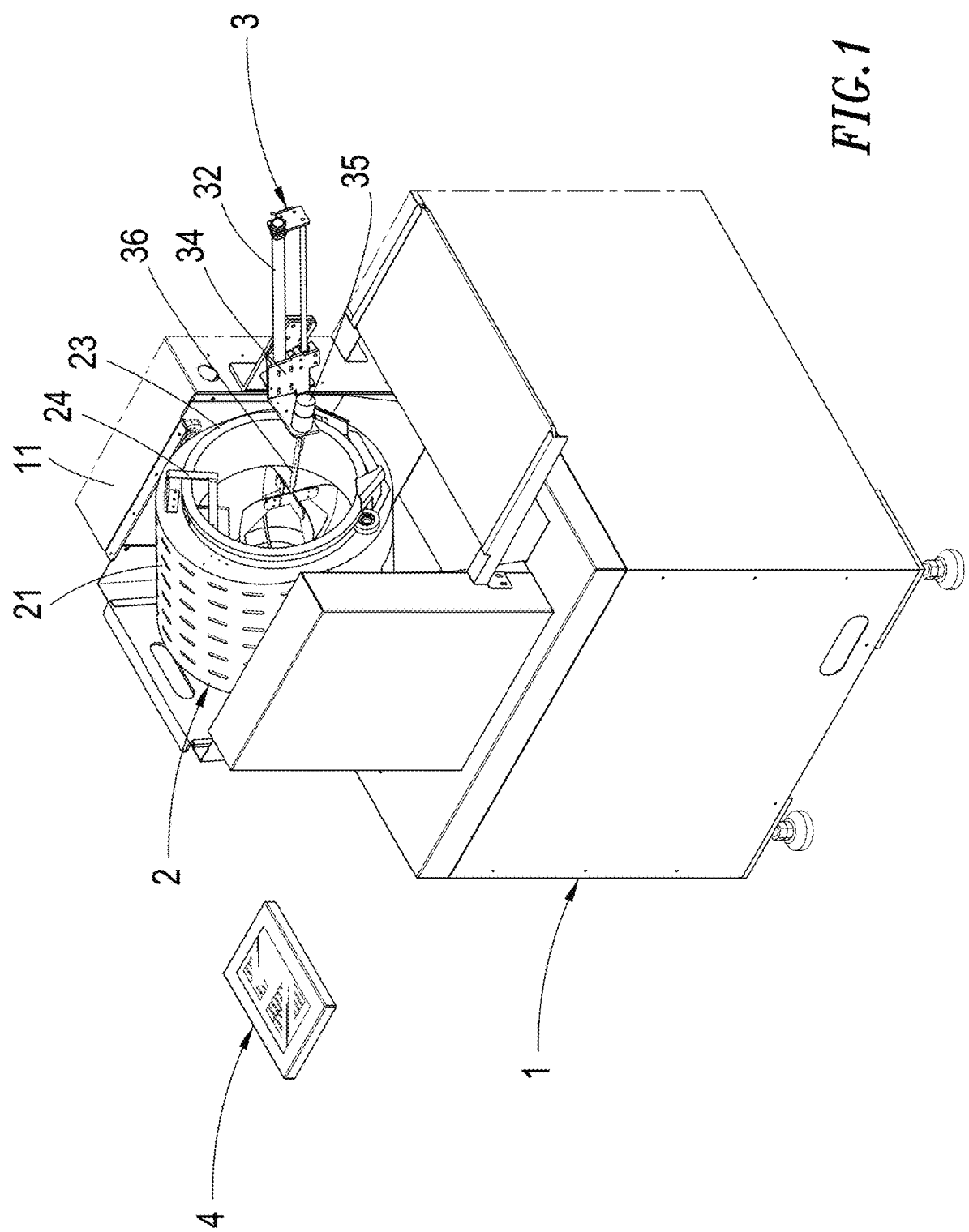
FIG. 1 shows an overall structural stereo view of the automatic food frying machine according to the present invention.

Refer first to FIG. 1, wherein an overall structural stereo view of the automatic stir-frying device in the automatic food frying machine according to the present invention is shown, and, as illustrated therein, it comprises a machine body 1, a food frying pot 2, a food material stir-frying device 3 and a master controller 4.

Herein the machine body 1 includes at least a support body 11.

Figure 2:
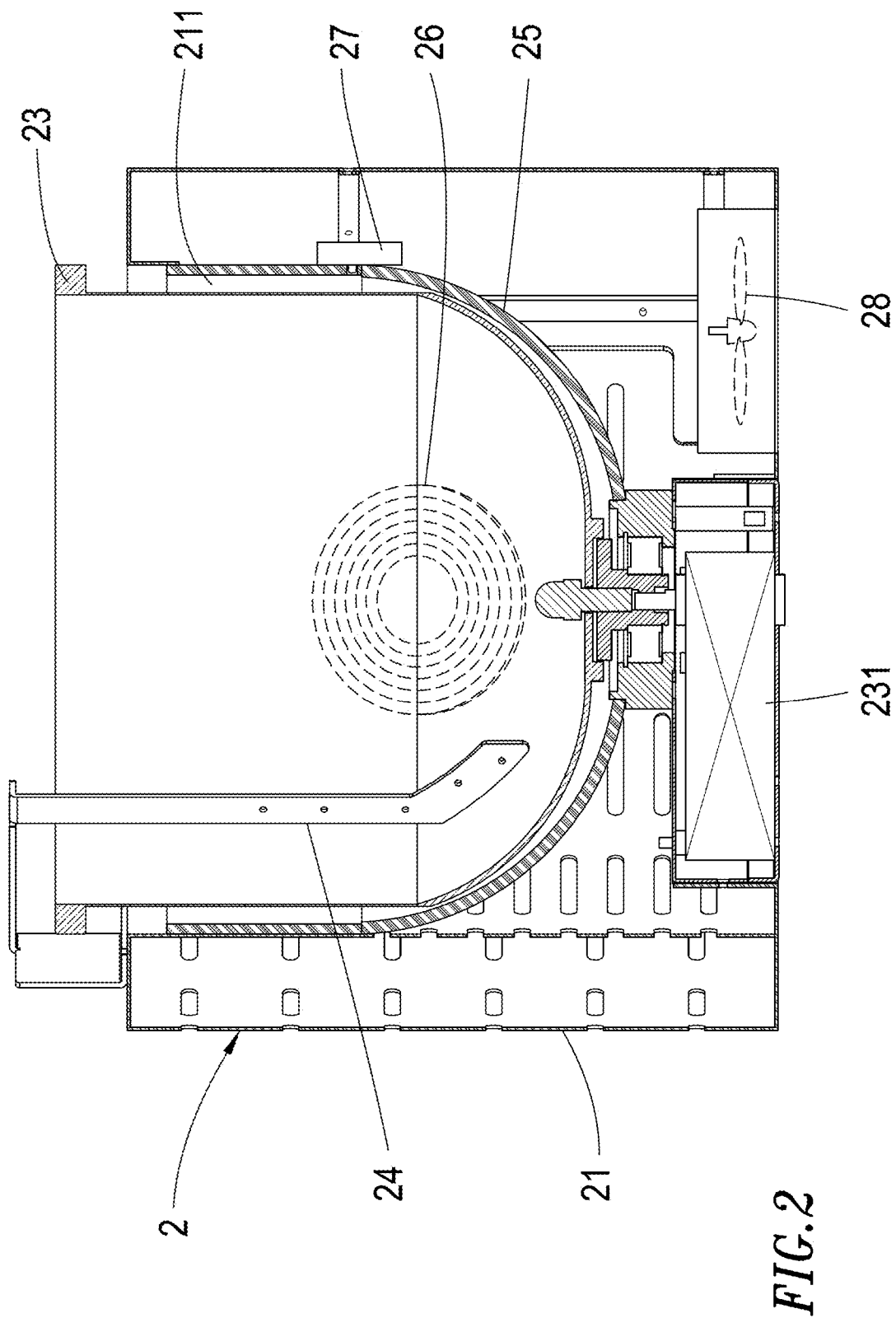
FIG. 2 shows a structural cross-section view of the food frying pot in the automatic food frying machine according to the present invention.
Figure 3:
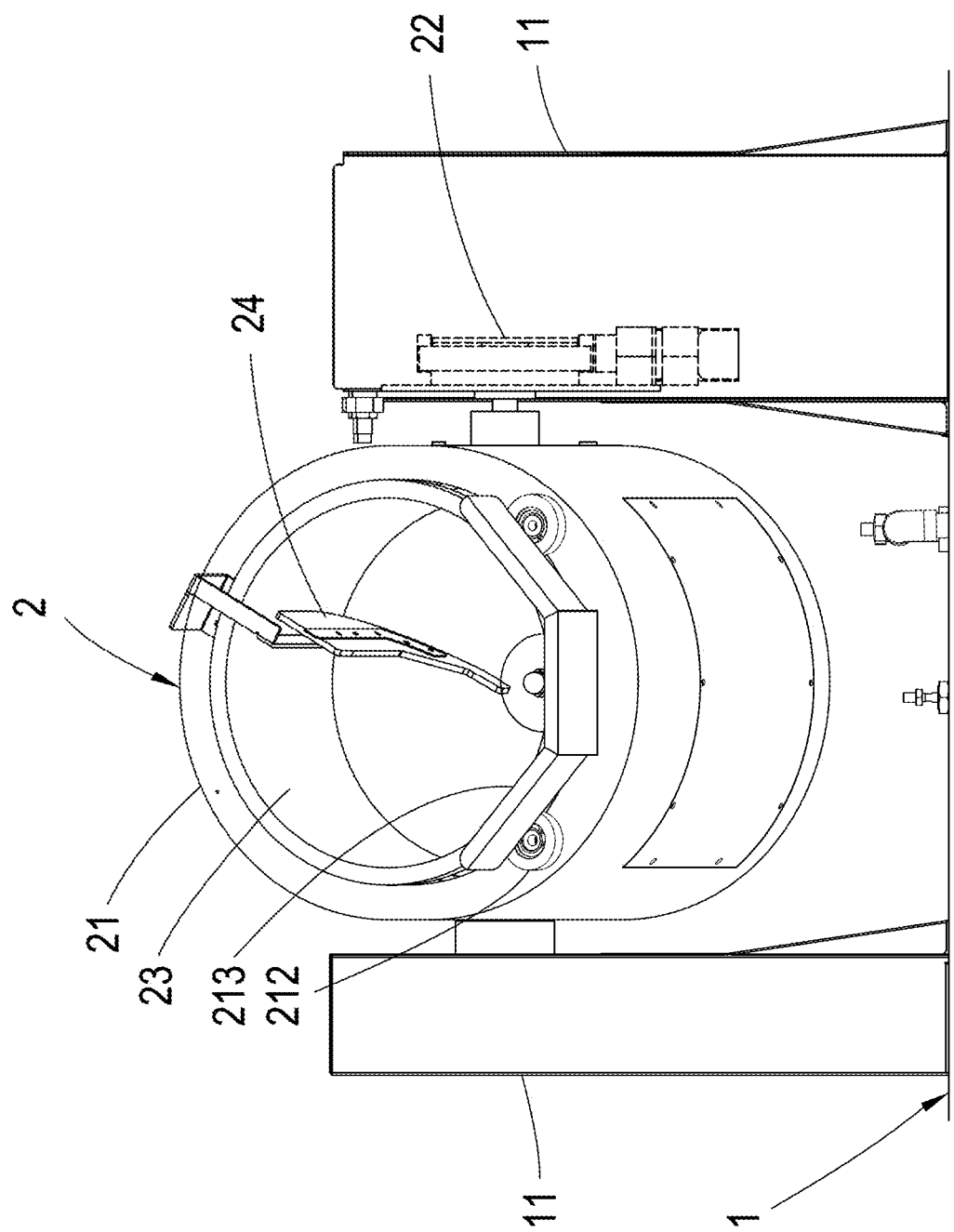
FIG. 3 shows a structural plane view of the food frying pot in the automatic food frying machine according to the present invention.

Herein referring conjunctively to FIGS. 1-3, it can seen that the food frying pot 2 includes at least one hollow outer case body 21 mounted on the support body 11 and pivotally installed with a servo motor 22. In the present embodiment, the servo motor 22 is installed inside the support body 11 and applied to memorize rotation angles to control the operation position of the outer case body 21; in addition, the outer case body 21 is recessively configured with a notch 211 from outside toward the inside, at least two guide wheels 212 are respectively installed at the opening edge of the notch 211, and a guide board 213 can be additionally installed at the opening edge of the notch 211 of the outer case body 21 and located oppositely between such two guide wheels 212. Next, the inside of the notch 211 is pivotally installed with an inner frying pot 23 whose bottom is pivotally set up with an inner pot motor 231 utilized to drive the inner frying pot 23 to rotate; in the present embodiment, the inner pot motor 231 is installed at the bottom of the notch 211. Moreover, the outer case body 21 is also fixedly installed with a scraper 24 which can extend and enter the inside of the inner frying pot 23, in which the scraper 24 is close to the inner wall of the inner frying pot 23, but not attaches thereto; besides, the outer periphery of the inner frying pot 23 is provided with a heat-resistant support board 25 made of glass, and the exterior of the heat-resistant support board 25 is attached with a heating coil 26, a temperature sensing device 27 and at least one radiator 28, in which the temperature sensing device 27 can detect the temperature on the outer wall of the inner frying pot 23 via the heat-resistant support board 25 thereby further controlling the temperature of the inner frying pot 23 upon heating it.

Figure 4A:
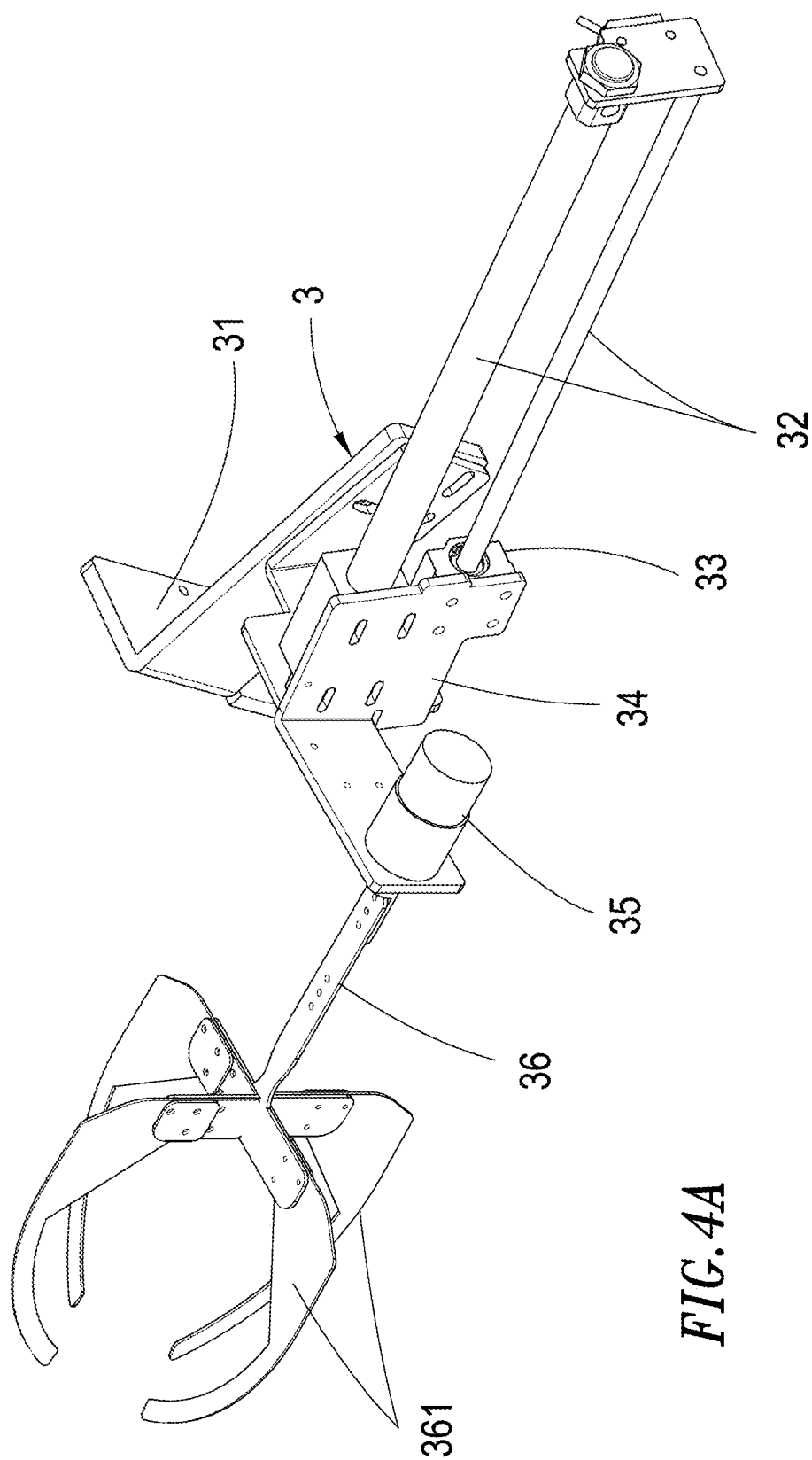
FIG. 4A shows a stereo view of the food material stir-frying device installed with 4 picks in the automatic food frying machine according to the present invention.
Figure 4B:
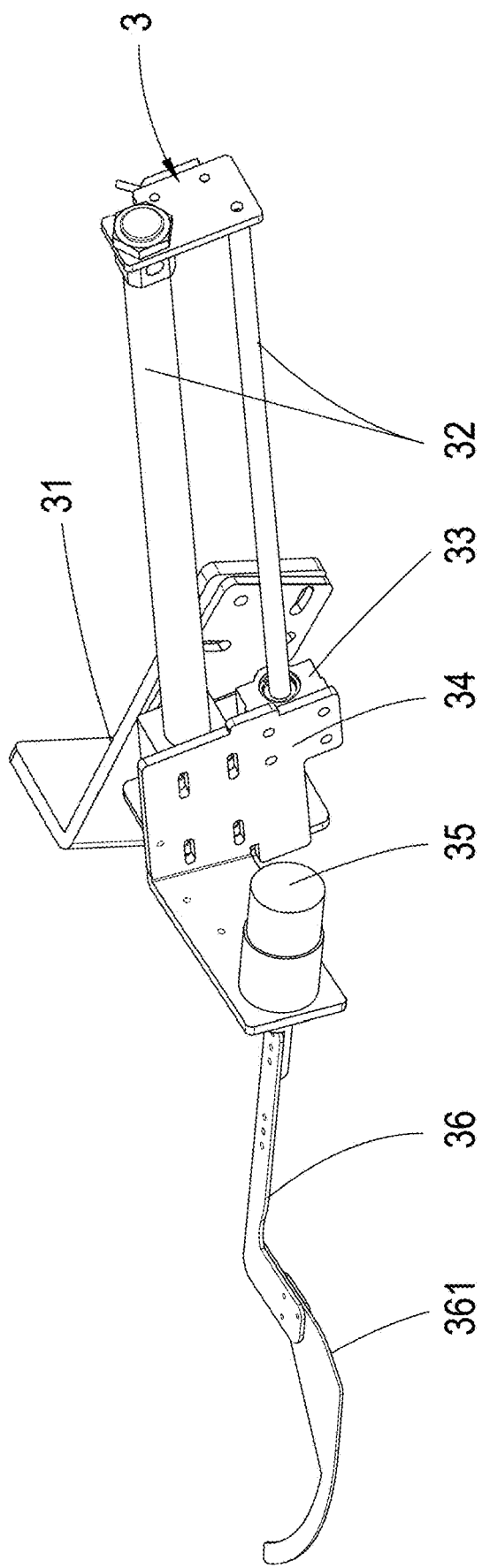
FIG. 4B shows a stereo view of the food material stir-frying device installed with 1 picks in the automatic food frying machine according to the present invention.
Figure 4C:
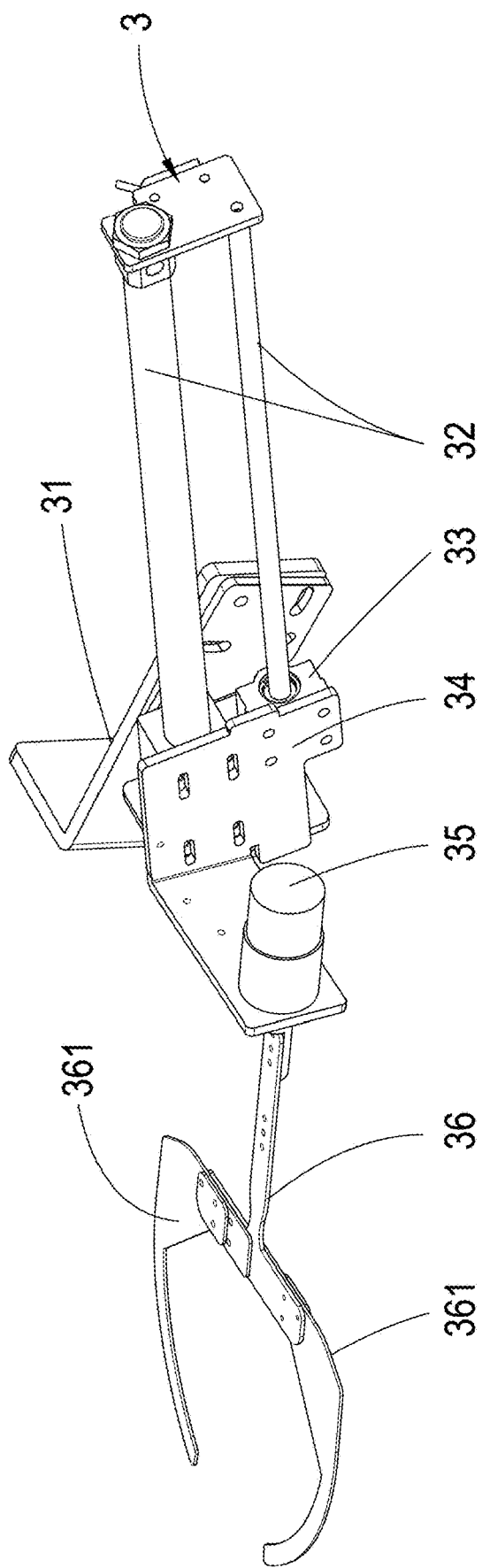
FIG. 4C shows a stereo view of the food material stir-frying device installed with 2 picks in the automatic food frying machine according to the present invention.
Figure 4D:
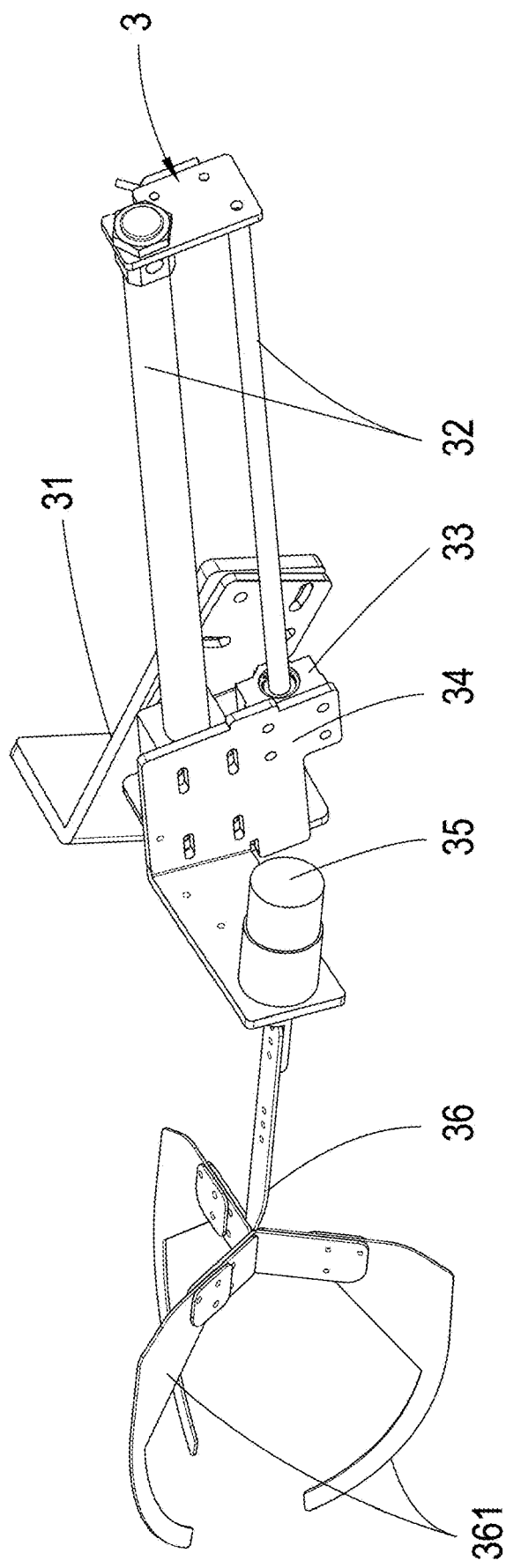
FIG. 4D shows a stereo view of the food material stir-frying device installed with 3 picks in the automatic food frying machine according to the present invention.

Subsequently, referring conjunctively to FIGS. 1 and 4A, it can be appreciated that the food material stir-frying device 3 includes a fixing frame 31 fixedly installed on the support body 11, in which a track rod 32 is installed on the fixing frame 31, a receive-send cylinder 33 is mounted on the track rod 32, a movable frame 34 is fixedly installed on the receive-send cylinder 33, a rotation motor 35 is mounted on the movable frame 34, and the rotation motor 35 is connected with a stir-frying device 36 which is assembled with at least one pick 361, and the receive-send cylinder 33 can drive the movable frame 34 to move back and forth on the track rod 32 such that the stir-frying device 36 can enter or exit the inner frying pot 23, and when the stir-frying device 36 enters into the inside of the inner frying pot 23, the pick 361 is located beside the scraper 24. By referring FIGS. 4A, 4B, 4C and 4D, it can be seen that the number of the picks 361 may vary, illustrated respectively as 1, 2, 3 and 4 picks 361.

Herein the master controller 4 is respectively connected to the servo motor 22, the inner pot motor 231, the heating coil 26, the temperature sensing device 27, the radiators 28, the receive-send cylinder 33 and the rotation motor 35 so as to facilitate the controls of the operations of such components and their parameters, and automatic or manual operation modes can be appropriately selected.

Figure 5A:
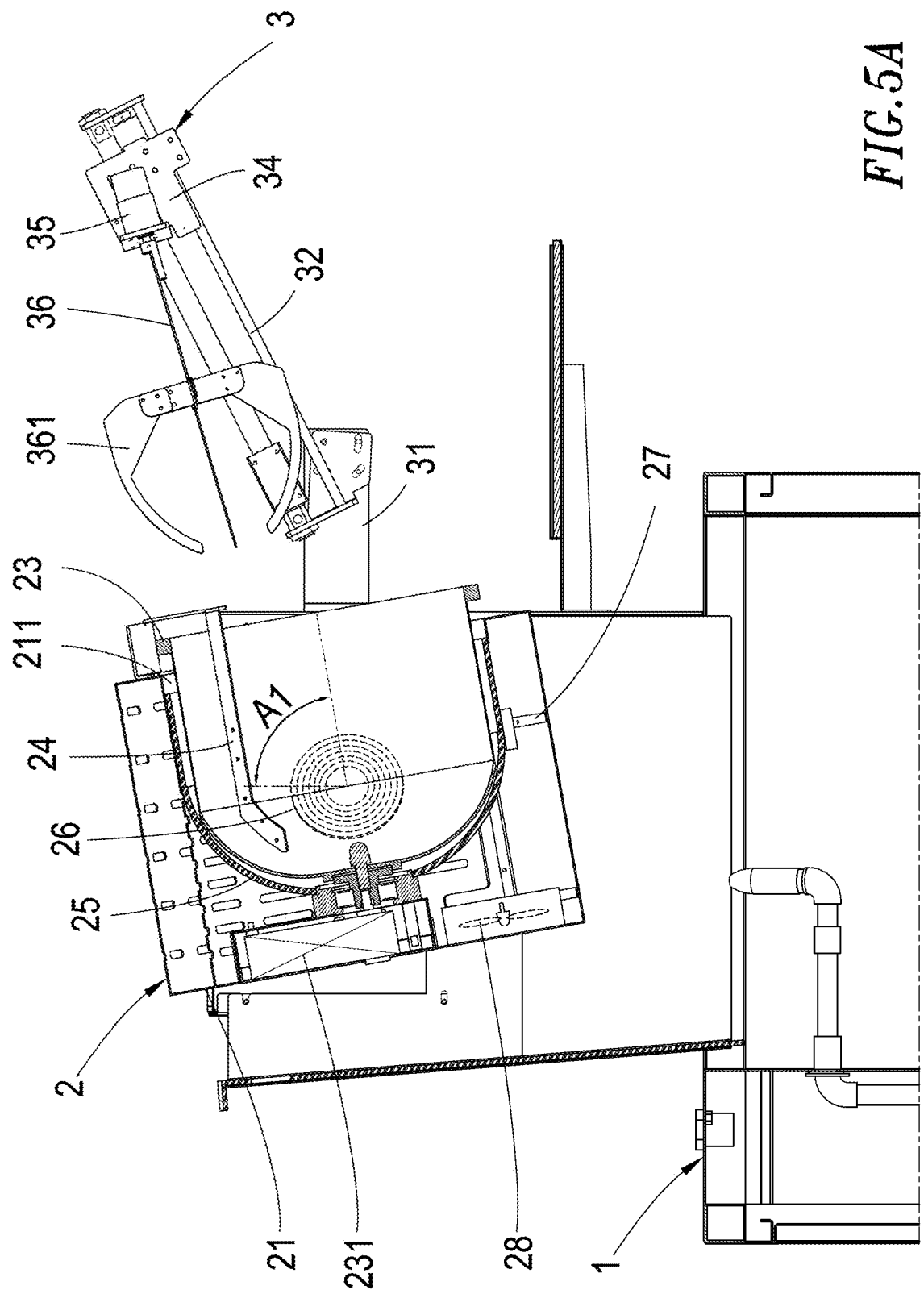
FIG. 5A shows a cross-section view of the automatic food frying machine according to the present invention, illustrated at its heating-pot angle.
Figure 5D:
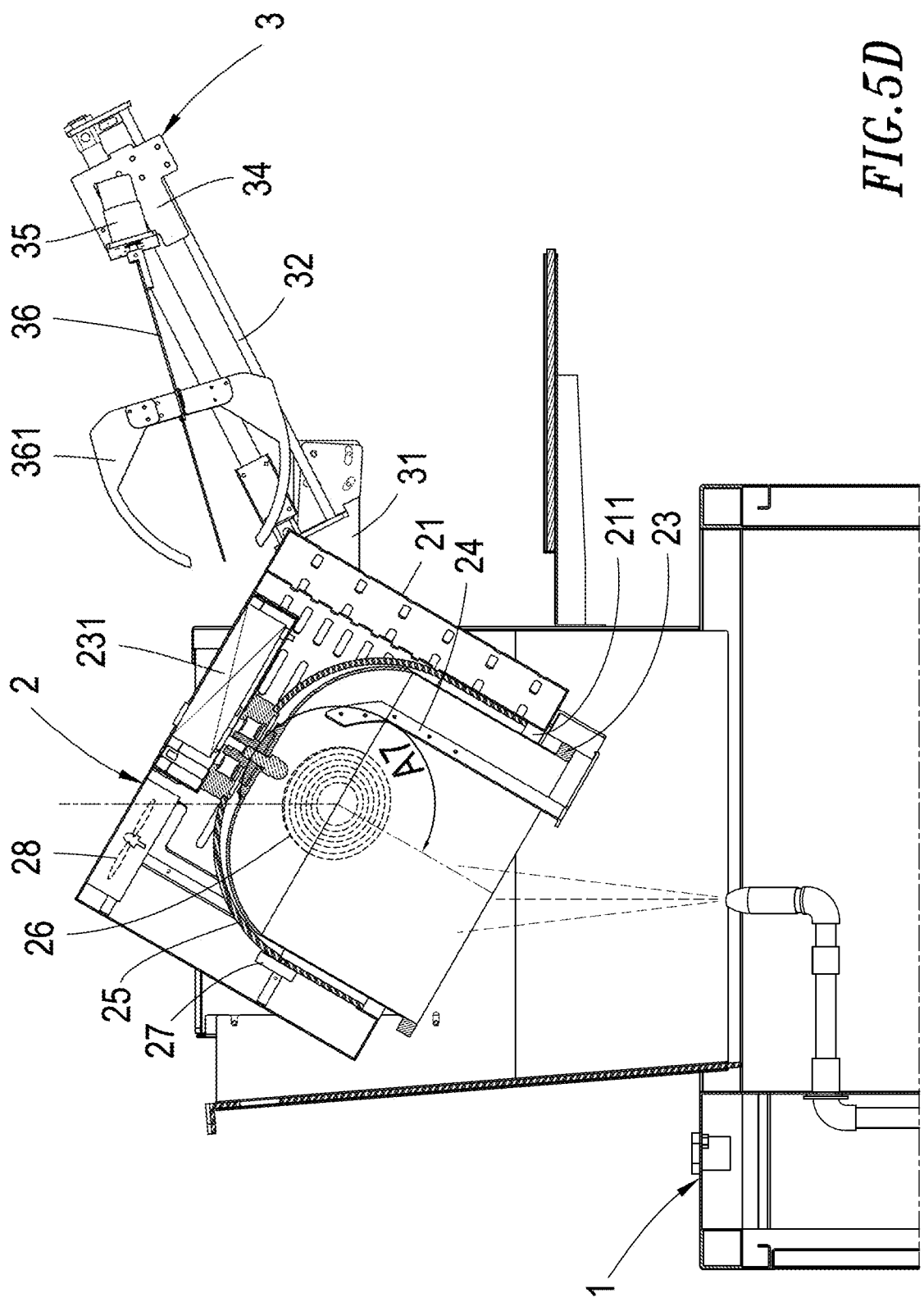
FIG. 5D shows a cross-section view of the automatic food frying machine according to the present invention, illustrated at its cleaning angle.

Refer then to FIG. 5A, wherein, in the automatic stir-frying device of food frying machines according to the present invention, the servo motor 22 can memorize the actions of the outer case body 21 corresponding to different angle ranges, and the outer case body 21 is driven by the servo motor 22 to a predetermined angular position for a specific operation all the time (for brevity, the following paragraphs will not specifically describe that the outer case body 21 is driven by the servo motor 22.) Then, after activation, the outer case body 21 is driven to turn to a heating-pot angle A1, and at this angle A1, the inner pot motor 231 and the heating coil 26 will start at the same time such that the heating coil 26 heats the inner frying pot 23 through the heat-resistant support board 25, and the inner frying pot 23 can be rotated by means of the inner pot motor 231 so that the heating can be uniform. When the temperature sensing device 27 detects that the inner frying pot 23 reaches a predetermined temperature, it adds oil therein and continuously heats the oil evenly in the inner frying pot 23, and when the temperature sensing device 27 measures that the inner frying pot 23 and the loaded oil together reach a preset temperature, the heating-pot process is determined to be completed and following cooking procedures can be performed. In the present embodiment, fried rice is used as an illustrative example. First, referring to FIG. 5B, eggs or egg liquid can be added, then the outer case body 21 is turned to a stir-frying angle A2 for scrambling the added egg liquid; after a preset duration of time, it is possible to add other materials or ingredients (e.g., hams, shredded pork, various vegetables etc.) to continue the stir-frying process, and further, after another predetermined time, rice can be added, and then finally other seasonings (scallions, garlic, salt, etc.) can be placed in so as to continue frying. Then, after drying and finishing the fried rice, referring to FIG. 5C, the outer case body 21 is turned to a pouring angle A3, and the completed fried rice can be poured into a container; referring to FIG. 5D, then, the outer case body 21 is turned to a cleaning angle A4 to facilitate cleaning the inner frying pot 23.

Specifically, referring to FIGS. 5A, 5B, 5C and 5D, the following table illustrates the memory in the servo motor 22 for the outer case body 21 being located at various angle ranges in terms of different operation demands, in which each angle includes the heating-pot angle A1, the stir-frying angle A2, the pouring angle A3 and the cleaning angle A4, and each angle is calculated with respect to the outer case body 21 arranged in a vertical state as 0 degree; the list of actions corresponding to each angle is shown below:

| Symbol | Range of Angle | Best Angle | Action |
| --- | --- | --- | --- |
| A1 | 75°, 76°, 77°, 78°, 79°, 80°, 81°, 82°, 83°, 84°, 85° | 80° | Heating-Pot |
| A2 | 67°, 68°, 69°, 70°, 71°, 72°, 73°, 74°, 75°, 76°, 77° | 72° | Stir-Frying |
| A3 | 110°, 111°, 112°, 113°, 114°, 115°, 116°, 117°, 118°, 119°, 120°, 121°, 122°, 123°, 124°, 125°, 126°, 127°, 128°, 129°, 130°, 131°, 132°, 133°, 134°, 135°, 136°, 137°, 138°, 139°, 140°, 141°, 142°, 143°, 144°, 145°, 146°, 147°, 148°, 149°, 150°, 151°, 152° | 150° | Pouring |
| A4 | 205°, 206°, 207°, 208°, 209°, 210°, 211°, 212°, 213°, 214°, 215° | 210° | Cleaning |

Figure 6:
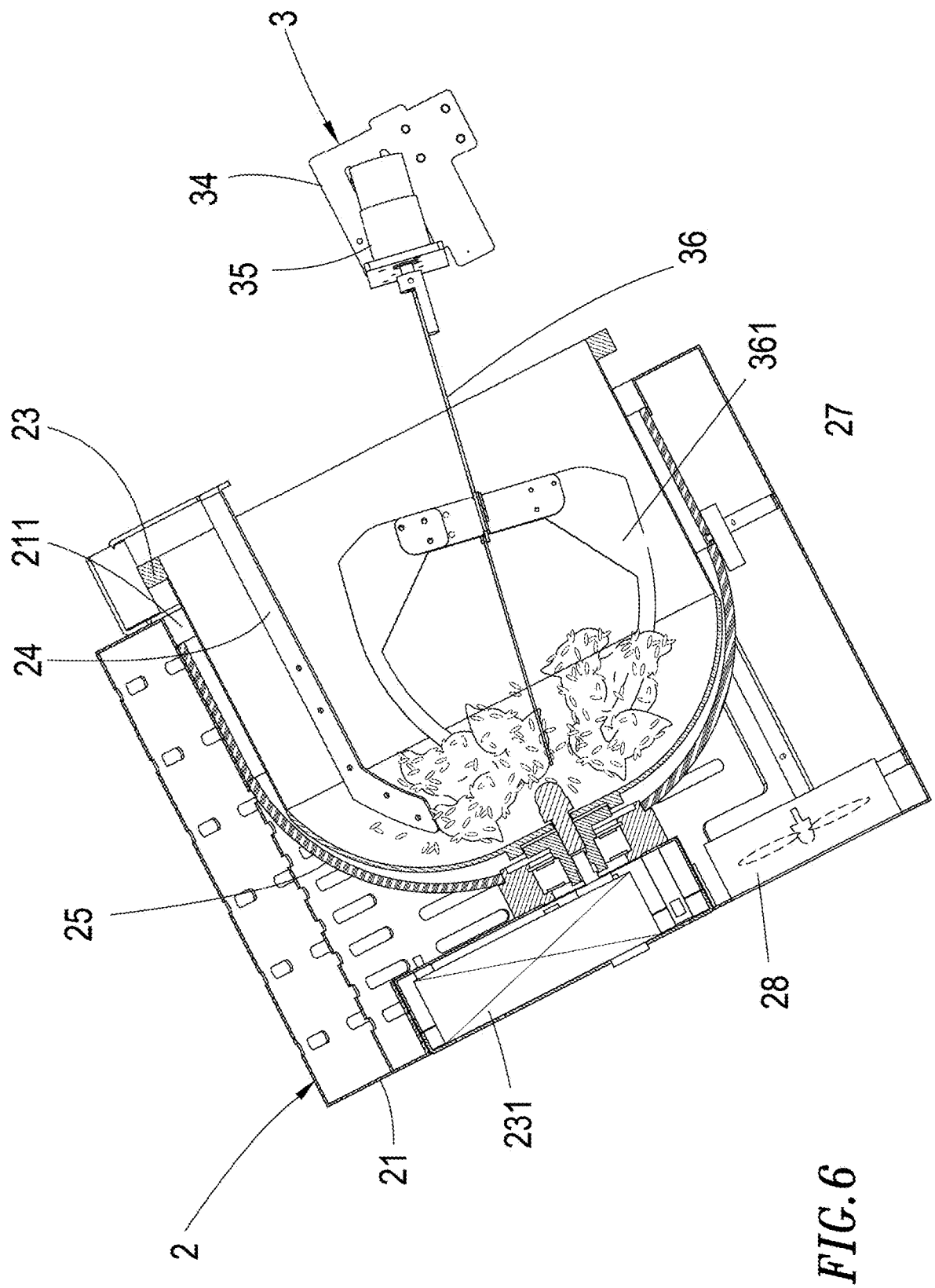
FIG. 6 shows a cross-section view for implementing the food material stir-frying process in the automatic food frying machine according to the present invention.
Figure 7:
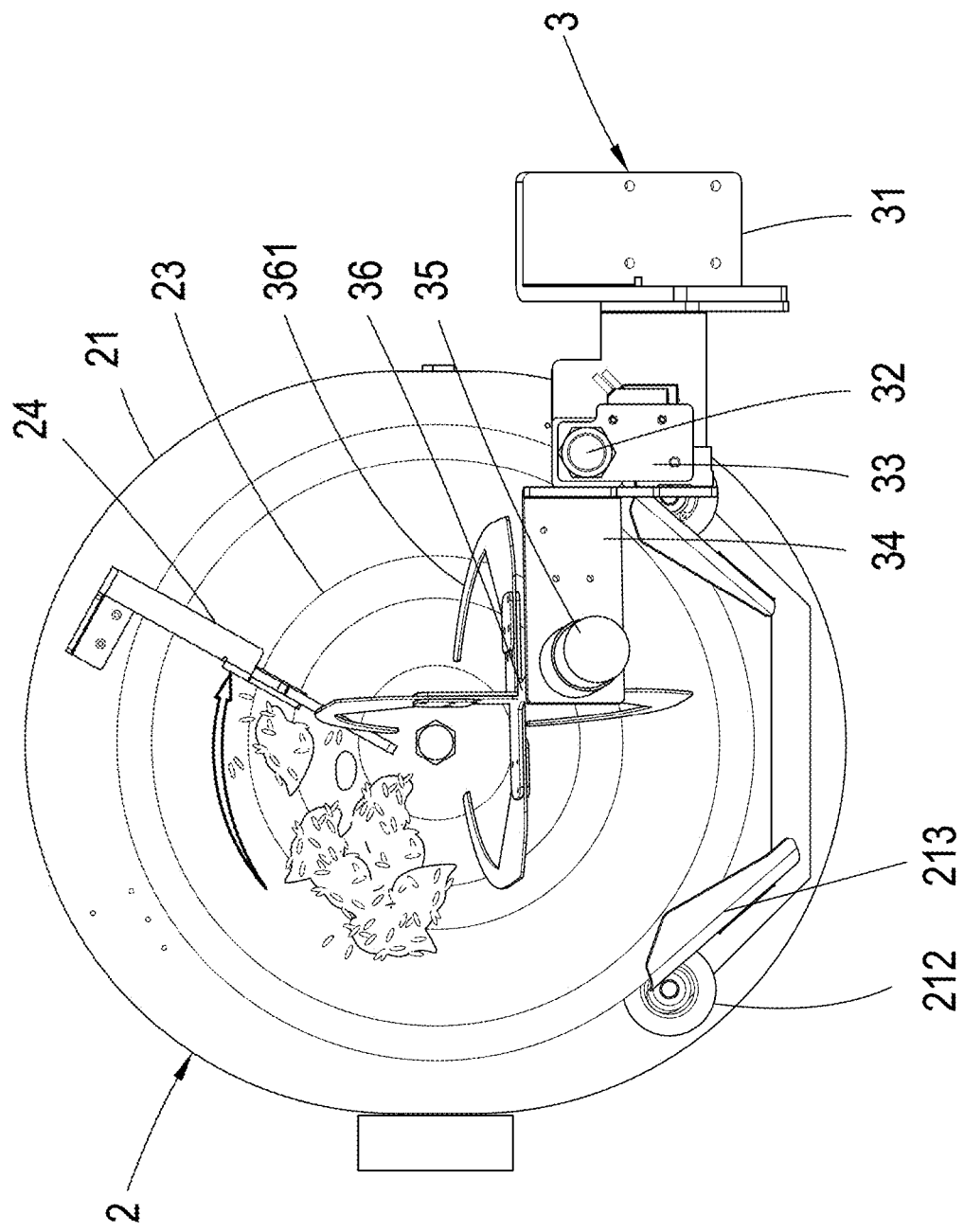
FIG. 7 shows a top view for implementing the food material stir-frying process in the automatic food frying machine according to the present invention.
Figure 8:
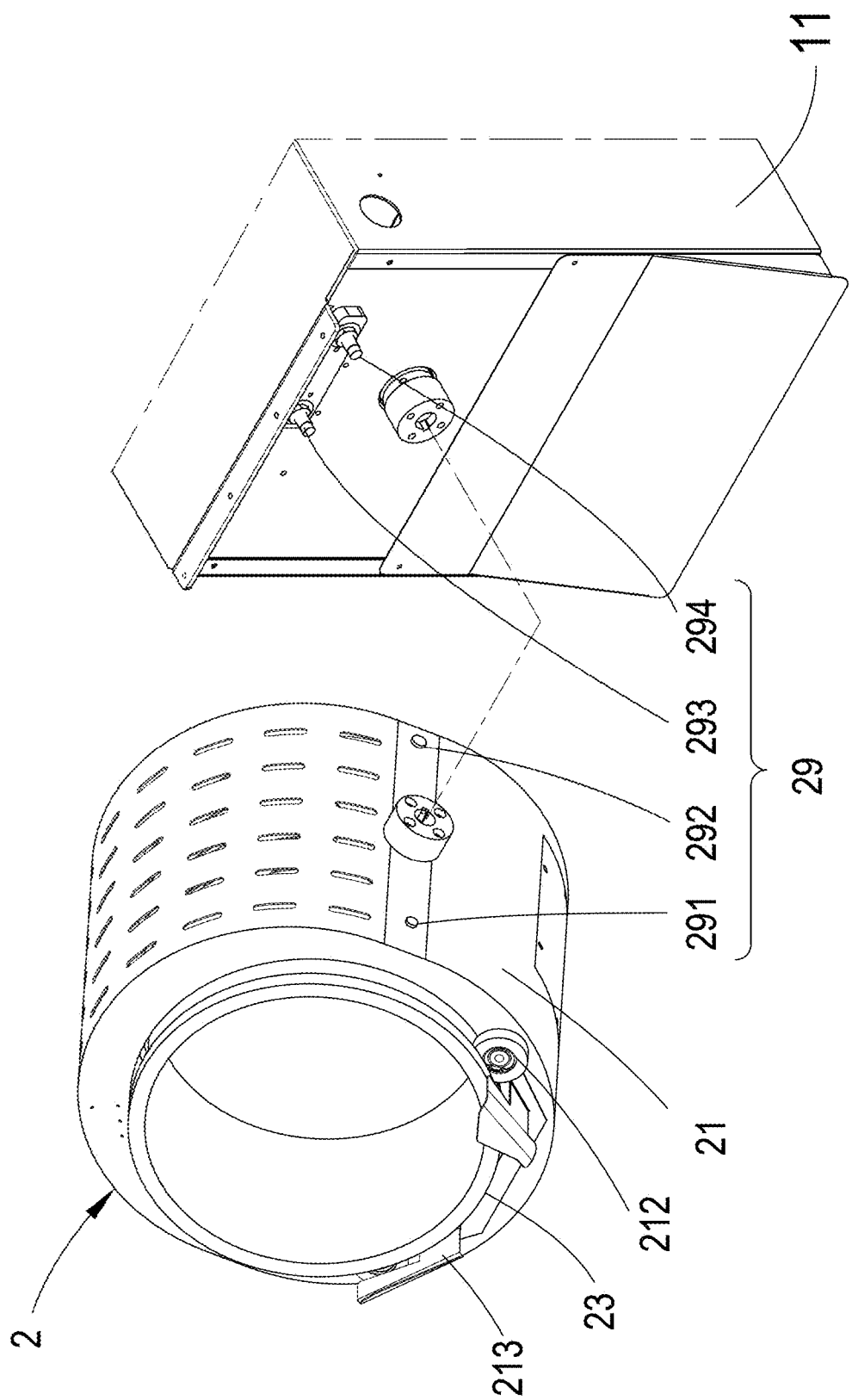
FIG. 8 shows a stereo disassembled view of additionally installing the position difference sensing device in the automatic food frying machine according to the present invention.
Figure 9B:
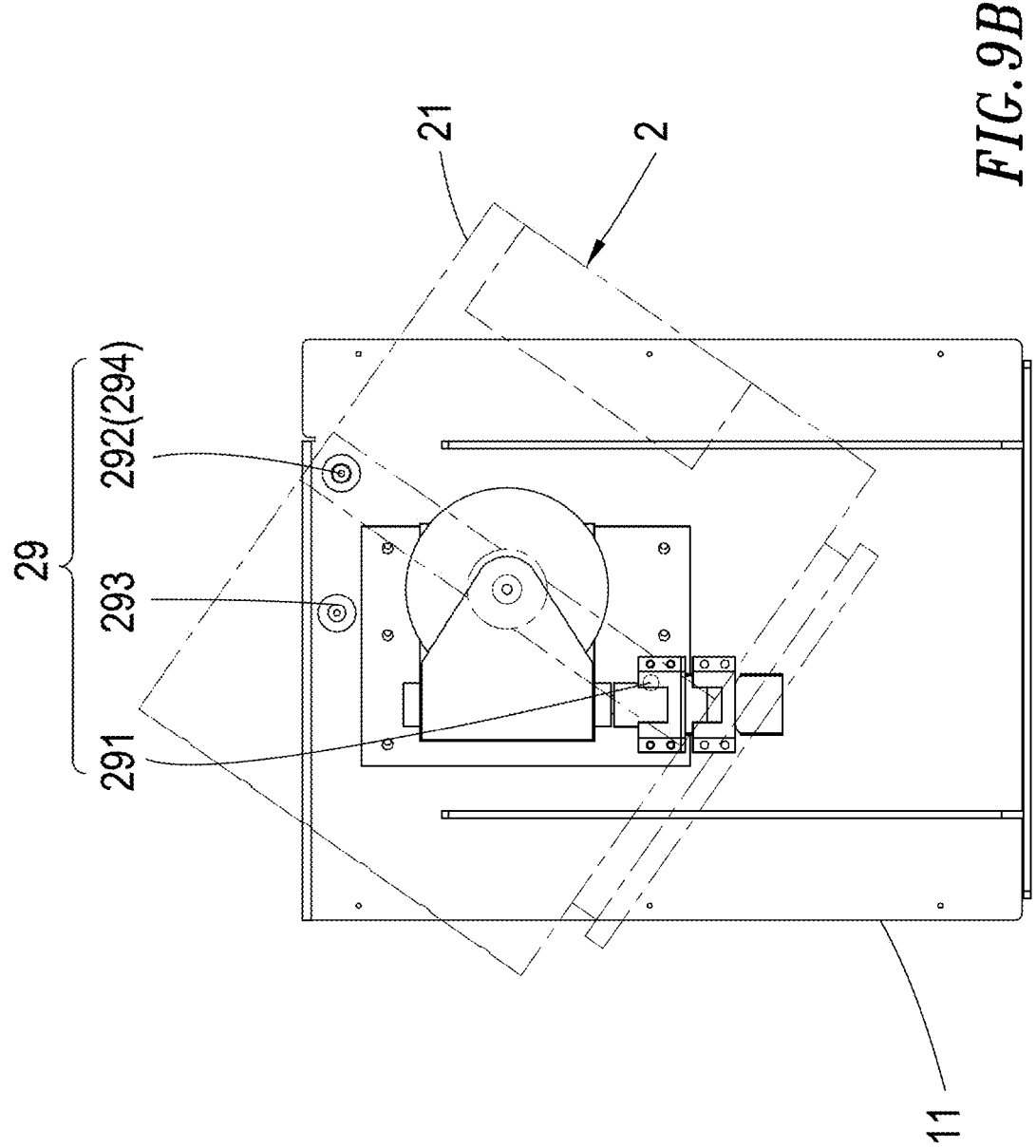
FIG. 9B shows a planar view of the outer case body in the automatic food frying machine according to the present invention, illustrated at its end position.

Furthermore, referring to FIGS. 6-8, it should be also noticed that, in the automatic stir-frying device of food frying machine according to the present invention, the stir-frying device 36 will continuously operate to toggle and stir the loaded food materials, e.g., fried rice, during the stir-frying process thereby facilitating more uniform ingredients, seasoning and heat distributions. In addition, during the stir-frying process, the pick 361 will continue to move and pass by the scraper 24 without interfering or hitting each other, and the food materials will be shoveled and pushed towards the scraper 24 so that the food materials can hit thereon; as a result, it is possible to effectively break up the agglomerated rice or even other sticky ingredients, thus making the cooked fried rice grains more clear and uniform; besides, this action can be also applied to other ingredients such as ham, shredded pork, vegetables, etc. so as to take out the juices contained in the meat or vegetable slices and then stir them into the rice thereby enhancing the flavor of fried rice.

Now refer to FIGS. 1-2, 8-9A and 9B, wherein, in the automatic stir-frying device of food frying machines according to the present invention, a position difference sensing device 29 connected to the master controller 4 may be installed at the exterior of the outer case body 21 and can be used to detect the positions of the initial and final rotation points of the outer case body 21 thereby limiting the movement of the outer case body 21 within a safe angle range. The aforementioned position difference sensing device 29 includes a start position determination block 291, an end position determination block 292, a start sensing terminal 293 and an end sensing terminal 294, in which the start position determination block 291 and the end position determination block 292 are individually installed on the surfaces of the exterior of the outer case body 21 opposite to the support body 11, while the start sensing terminal 293 and the end sensing terminal 294 are individually installed on the surfaces of the exterior of the support body 11 opposite to the outer case body 21, such that, when the outer case body 21 rotates, if the start sensing terminal 293 detects the start position determination block 291 or alternatively the end sensing terminal 294 detects the end position determination block 292, then the master controller 4 controls the servo motor 22 to stop the rotation operation. In the present embodiment, it can be seen that, when the start sensing terminal 293 detects the start position determination block 291, the outer case body 21 is at the position of 8°, and, on the other hand, when the end sensing terminal 294 detects the end position determination block 292, the outer case body 21 is at the position of 215°, indicating that the safe angle range of the outer case body 21 is between 8°~215°, and since the outer case body 21 is restricted to fall within such a start/end angle range, the outer case body 21 can only return to the standby position by way of the reverse rotation approach so as to prevent continuous rotation actions which may adversely lead to coil or wire winding issues.

The previously disclosed embodiments are merely illustrative of some preferred ones of the present invention, which are not intended to limit the scope thereof; those who are skilled in the relevant technical fields can, after understanding the technical features and embodiments of the present invention as explained hereinabove, certainly make equivalent changes, alterations or modifications without departing from the spirit and scope of the present invention, which are nonetheless deemed as falling within the coverage of the present invention; accordingly, the scope of the present invention to be protected by patent laws is subject to the definition of the claims attached to this specification.

What is claimed is:

1. An automatic stir-frying device of food frying machines, comprising:
   a machine body, including at least a support body;
   a food frying pot, including at least a hollow outer case body mounted on the support body, in which the outer case body is pivotally installed with a servo motor which is used to memorize a rotation angle in order to control the operating position of the outer case body, and the outer case body is recessively installed with a notch from the outside toward the inside, and the interior of the notch is pivotally installed with an inner frying pot whose bottom is pivotally installed with an inner pot motor, and in which a scraper is fixedly installed on the outer case body and extends into the inside of the inner frying pot, a food material stir-frying device, including a fixing frame fixedly installed on the support body, in which a track rod is installed on the fixing frame, a receive-send cylinder is mounted on the track rod, a movable frame is fixedly installed on the receive-send cylinder, a rotation motor is mounted on the movable frame, and the rotation motor is connected with a stir-frying device which is assembled with at least one pick, and the receive-send cylinder can drive the movable frame to move back and forth on the track rod such that the stir-frying device can enter or exit the inner frying pot, and when the stir-frying device enters into the inside of the inner frying pot, the pick is located beside the scraper; and a master controller, respectively connected to the servo motor, the inner pot motor, the receive-send cylinder as well as the rotation motor, wherein a position difference sensing device connected to the master controller is installed at the exterior of the outer case body and can be used to detect the positions of the initial and final rotation points of the outer case body thereby limiting the movement of the outer case body within a safe angle range, and wherein the position difference sensing device includes a start position determination block, an end position determination block, a start sensing terminal and an end sensing terminal, in which the start position determination block and the end position determination block are individually installed on the surfaces of the exterior of the outer case body opposite to the support body, while the start sensing terminal and the end sensing terminal are individually installed on the surfaces of the exterior of the support body opposite to the outer case body, such that, when the outer case body rotates, if the start sensing terminal detects the start position determination block or alternatively the end sensing terminal detects the end position determination block, then the master controller controls the servo motor to stop the rotation operation.

2. The automatic stir-frying device of food frying machines according to claim 1, wherein at least two guide wheels are respectively installed at the opening edge of the notch.

3. The automatic stir-frying device of food frying machines according to claim 2, wherein a guide board is installed at the opening edge of the notch and located between the two guide wheels.

4. The automatic stir-frying device of food frying machines according to claim 1, wherein the scraper is close to the inner wall of the inner frying pot, but not attached thereto.

5. The automatic stir-frying device of food frying machines according to claim 1, wherein the number of the picks is configured to be 1, 2, 3 or 4.

6. The automatic stir-frying device of food frying machines according to claim 1, wherein the servo motor memorizes a heating-pot angle, a stir-frying angle, a pouring angle and a cleaning angle so that the outer case body can operate at different angles.

7. The automatic stir-frying device of food frying machines according to claim 6, wherein the heating-pot angle ranges 75°~85°, the stir-frying angle ranges 67°~77°, the pouring angle ranges 110°~152° and the cleaning angle ranges 205°~215°.

* * * * *